US011112249B1

(12) United States Patent
Jakusz

(10) Patent No.: US 11,112,249 B1
(45) Date of Patent: Sep. 7, 2021

(54) SYSTEMS AND METHODS FOR FOUR-DIMENSIONAL ROUTING AROUND CONCAVE POLYGON AVOIDANCES

(71) Applicant: Rockwell Collins, Inc., Cedar Rapids, IA (US)

(72) Inventor: Jason J. Jakusz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/140,032

(22) Filed: Sep. 24, 2018

(51) Int. Cl.
| | | |
|---|---|---|
| *G01C 21/20* | (2006.01) | |
| *G05D 1/10* | (2006.01) | |
| *G01C 21/00* | (2006.01) | |
| *G08G 5/00* | (2006.01) | |
| *G01C 23/00* | (2006.01) | |
| *G06F 16/29* | (2019.01) | |

(52) U.S. Cl.
CPC ........... *G01C 21/20* (2013.01); *G01C 21/005* (2013.01); *G01C 23/005* (2013.01); *G05D 1/101* (2013.01); *G06F 16/29* (2019.01); *G08G 5/0034* (2013.01); *G08G 5/0039* (2013.01)

(58) Field of Classification Search
None
See application file for complete search history.

(56) References Cited

U.S. PATENT DOCUMENTS

| | | | | |
|---|---|---|---|---|
| 7,650,232 B1* | 1/2010 | Paielli | ................ | G01C 23/005 340/963 |
| 8,332,084 B1* | 12/2012 | Bailey | ................ | G05D 1/0204 701/10 |
| 8,386,100 B1* | 2/2013 | Lie | ................ | G08G 5/0026 244/75.1 |
| 9,171,473 B1* | 10/2015 | McNally | ................ | G08G 5/0039 |
| 9,224,302 B1* | 12/2015 | Young | ................ | G08G 5/0039 |
| 2003/0195672 A1* | 10/2003 | He | ................ | G08G 5/0052 701/3 |
| 2009/0319100 A1* | 12/2009 | Kale | ................ | G08G 5/0021 701/4 |
| 2010/0211306 A1* | 8/2010 | Varadarajan | ........... | G08G 5/006 701/532 |
| 2013/0124089 A1* | 5/2013 | Herman | ................ | G08G 5/0021 701/528 |
| 2015/0332490 A1* | 11/2015 | Coulmeau | ............. | G06T 11/206 701/3 |

(Continued)

*Primary Examiner* — Dale W Hilgendorf
*Assistant Examiner* — Alexander C. Bost
(74) *Attorney, Agent, or Firm* — Suiter Swantz pc llo

(57) ABSTRACT

A navigation system includes a navigation database and a route generator. The route generator receives an avoidance, generates a concave polygon representing the avoidance with respect to four-dimensional data of the navigation database, identifies a displacement vector of the avoidance, shifts the concave polygon using the displacement vector, identifies each gap between vertices of the shifted concave polygon, adds an added edge to the to connect vertices across each identified gap, determines, for each edge of the concave polygon, if the edge includes an internal edge, removes each internal edge from the concave polygon, compares the concave polygon to the plurality of cells, identifies one or more cells in which the concave polygon is located, and outputs a navigation alert based on the identified one or more cells.

18 Claims, 10 Drawing Sheets

(56) References Cited

U.S. PATENT DOCUMENTS

| | | | |
|---|---|---|---|
| 2015/0336676 A1* | 11/2015 | McCann | G08G 5/0039 |
| | | | 701/3 |
| 2015/0360566 A1* | 12/2015 | Bas Gago | G01S 7/24 |
| | | | 340/971 |
| 2016/0293021 A1* | 10/2016 | Shipley | G08G 5/003 |
| 2018/0025649 A1* | 1/2018 | Contreras | G01C 21/00 |
| | | | 701/3 |
| 2018/0342166 A1* | 11/2018 | Borgyos | G01C 23/00 |
| 2019/0147649 A1* | 5/2019 | Brochu | G06T 19/20 |
| | | | 345/420 |
| 2019/0147752 A1* | 5/2019 | Scarlatti | G08G 5/0082 |
| | | | 701/120 |
| 2019/0162555 A1* | 5/2019 | Youssef | G08G 5/0086 |
| 2019/0340934 A1* | 11/2019 | Villa | G08G 5/003 |

\* cited by examiner

SYSTEMS AND METHODS FOR FOUR-DIMENSIONAL ROUTING AROUND CONCAVE POLYGON AVOIDANCES

BACKGROUND

The present disclosure generally relates to navigation systems. More particularly, the present disclosure relates to systems and methods for four-dimensional routing around concave polygon avoidances.

In existing systems for navigational routing, a grid may be used to discretize a space to be travelled through into cells and calculate paths through the cells. Avoidances, such as inclement weather and other entities or events to be avoided when calculating the paths through the cells, may be represented using polygons. For example, navigation systems may represent avoidances using convex polygons or concave polygons.

SUMMARY

In one aspect, the inventive concepts disclosed herein are directed to a navigation system. The navigation system includes a navigation database and a route generator. The navigation database maintains four-dimensional data corresponding to a plurality of cells into which the four-dimensional data is divided, each cell representing a three-dimensional space from a start time to an end time. The route generator is configured to receive an avoidance corresponding to the four-dimensional data; generate a concave polygon representing the avoidance at the start time, the concave polygon including a plurality of edges; identify a displacement vector corresponding to movement of the avoidance; identify, based on the displacement vector, at least one leading edge and at least trailing edge of the concave polygon at the start time; shift each leading edge from the start time to the end time using the displacement vector; identify each gap between vertices of the plurality of edges of the at least one trailing edge and the shifted at least one leading edge; add an added edge to the plurality of edges of the concave polygon to connect vertices across each identified gap; determine, for each edge of the plurality of edges of the concave polygon, if the edge includes an internal edge; remove each internal edge from the concave polygon; compare the concave polygon to the plurality of cells; identify one or more cells in which the concave polygon is located; and output a navigation alert based on the identified one or more cells.

In a further aspect, the inventive concepts disclosed herein are directed to a navigation route generator. The navigation route generator includes one or more processors and a non-transient computer-readable medium storing processor-executable instructions which, when executed by the one or more processors, cause the one or more processors to maintain, in a navigation database, four-dimensional data corresponding to a plurality of cells into which the four-dimensional data is divided, each cell representing a three-dimensional space from a start time to an end time; receive an avoidance corresponding to four-dimensional data; generate a concave polygon representing the avoidance at the start time, the concave polygon including a plurality of edges; identify a displacement vector corresponding to movement of the avoidance; identify, based on the displacement vector, at least one leading edge and at least trailing edge of the concave polygon at the start time; shift each leading edge from the start time to the end time using the displacement vector; identify each gap between vertices of the plurality of edges of the at least one trailing edge and the shifted at least one leading edge; add an added edge to the plurality of edges of the concave polygon to connect vertices across each identified gap; determine, for each edge of the plurality of edges of the concave polygon, if the edge includes an internal edge; remove each internal edge from the concave polygon; compare the concave polygon to the plurality of cells; identify one or more cells in which the concave polygon is located; and output a navigation alert based on the identified one or more cells.

In a further aspect, the inventive concepts disclosed herein are directed to a method. The method includes maintaining, by a navigation database, four-dimensional data corresponding to a plurality of cells into which the four-dimensional data is divided, each cell representing a three-dimensional space from a start time to an end time; receiving, by a route generator, an avoidance corresponding to the four-dimensional data; generating, by the route generator, a concave polygon representing the avoidance at the start time, the concave polygon including a plurality of edges; identifying, by the route generator, a displacement vector corresponding to movement of the avoidance; identifying, by the route generator based on the displacement vector, at least one leading edge and at least trailing edge of the concave polygon at the start time; shifting, by the route generator, each leading edge from the start time to the end time using the displacement vector; identifying, by the route generator, each gap between vertices of the plurality of edges of the at least one trailing edge and the shifted at least one leading edge; adding, by the route generator, an added edge to the plurality of edges of the concave polygon to connect vertices across each identified gap; determining, by the route generator, for each edge of the plurality of edges of the concave polygon, if the edge includes an internal edge; removing, by the route generator, each internal edge from the concave polygon; comparing, by the route generator, the concave polygon to the plurality of cells; identifying, by the route generator, one or more cells in which the concave polygon is located; and outputting, by the route generator, a navigation alert based on the identified one or more cells.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
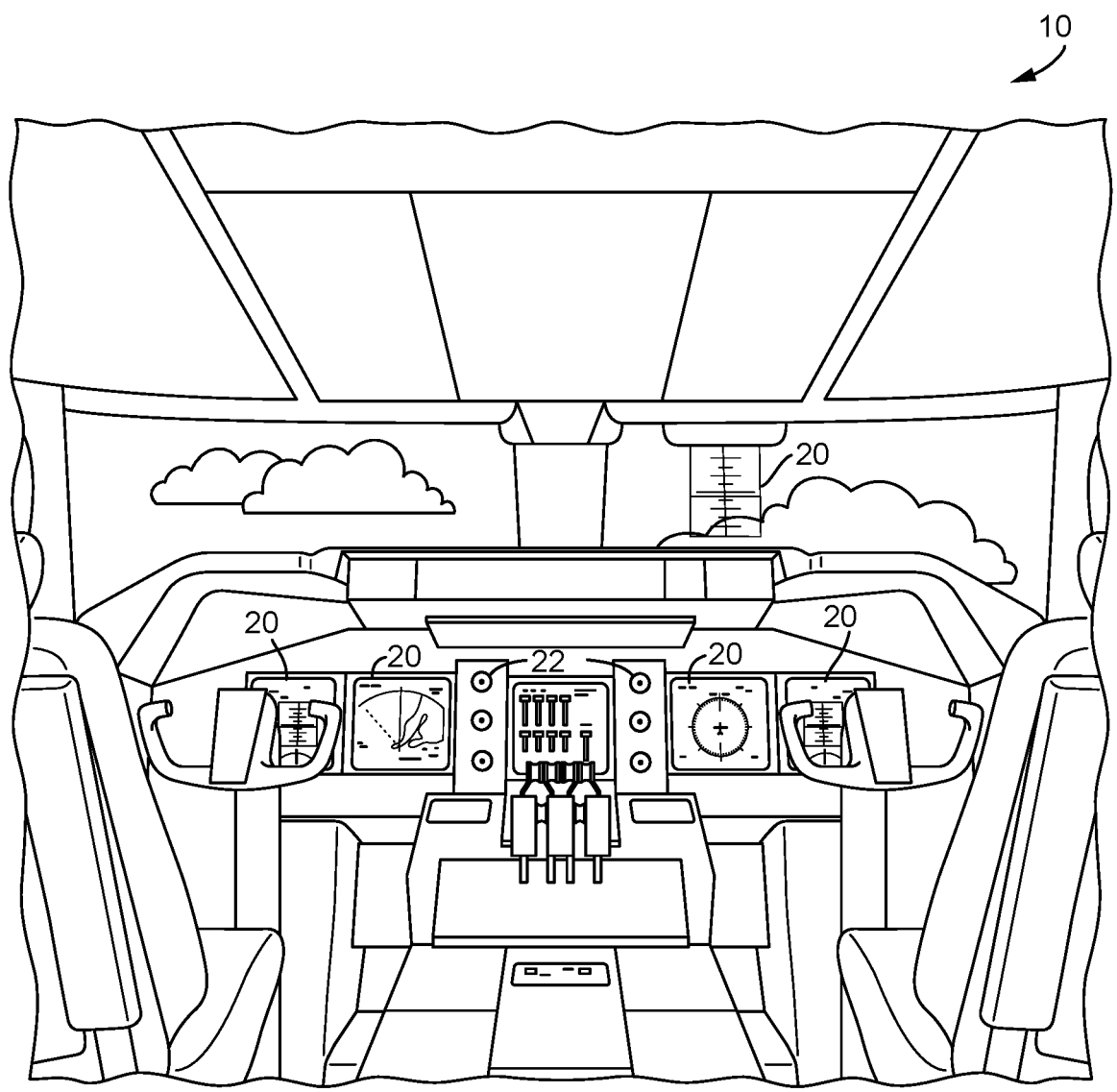
FIG. 1 is a schematic diagram of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for four-dimensional routing around moving concave polygon avoidances. The inventive concepts disclosed herein can be utilized in various types of electronic avionics applications for airborne platforms (e.g., fixed wing aircraft, rotary wing aircraft), including but not limited to flight control and autopilot systems, navigation systems, flight display systems, communications systems, and radar systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a navigation system includes a navigation database and a route generator. The navigation database maintains four-dimensional data corresponding to a plurality of cells into which the four-dimensional data is divided, each cell representing a three-dimensional space from a start time to an end time. The route generator is configured to receive an avoidance corresponding to the four-dimensional data; generate a concave polygon representing the avoidance at the start time, the concave polygon including a plurality of edges; identify a displacement vector corresponding to movement of the avoidance; identify, based on the displacement vector, at least one leading edge and at least trailing edge of the concave polygon at the start time; shift each leading edge from the start time to the end time using the displacement vector; identify each gap between vertices of the plurality of edges of the at least one trailing edge and the shifted at least one leading edge; add an added edge to the plurality of edges of the concave polygon to connect vertices across each identified gap; determine, for each edge of the plurality of edges of the concave polygon, if the edge includes an internal edge; remove each internal edge from the concave polygon; compare the concave polygon to the plurality of cells; identify one or more cells in which the concave polygon is located; and output a navigation alert based on the identified one or more cells.

The system can be integrated with an airborne platform or other platform as described herein. For example, the navigation systems described herein can be associated with an aircraft cockpit display of the airborne platform.

Systems manufactured in accordance with the inventive concepts disclosed herein can improve operation of avionics systems and navigation technology by more effectively finding navigation routing solutions that are accurate, safe, avoid obstacles, have a higher likelihood of being approved (e.g., by an air traffic controller), and reduce computational resources and/or increase computational speed. Concave polygon avoidances can be difficult to evaluate, particularly as the avoidances move over time. For example, it can be computationally intensive to determine whether points in space in a vicinity of the concave polygon are actually located within the concave polygon as the avoidance moves over time. Existing systems typically handle concave polygon avoidances by converting the concave polygons to convex polygons prior to calculating navigation solutions, which can be computationally intensive by increasing the amount of computations required to generate the navigation solution, and may also reduce accuracy of the generated solutions due to the conversions. The inventive concepts disclosed herein can directly handle concave polygons, even as they move over time, when calculating navigation solutions, which can reduce computational requirements while increasing the speed and accuracy of calculating the navigation solutions. As such, the inventive concepts disclosed herein can provide technical improvements in calculating navigation solutions, including improving the speed and accuracy of operation of navigation computers.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, HUDs with or without a projector, head up guidance systems, wearable displays, watches, Google Glass® or other HWD systems. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, a sensor system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization generated based on an indication of a runway surface condition, and display the image information.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2:
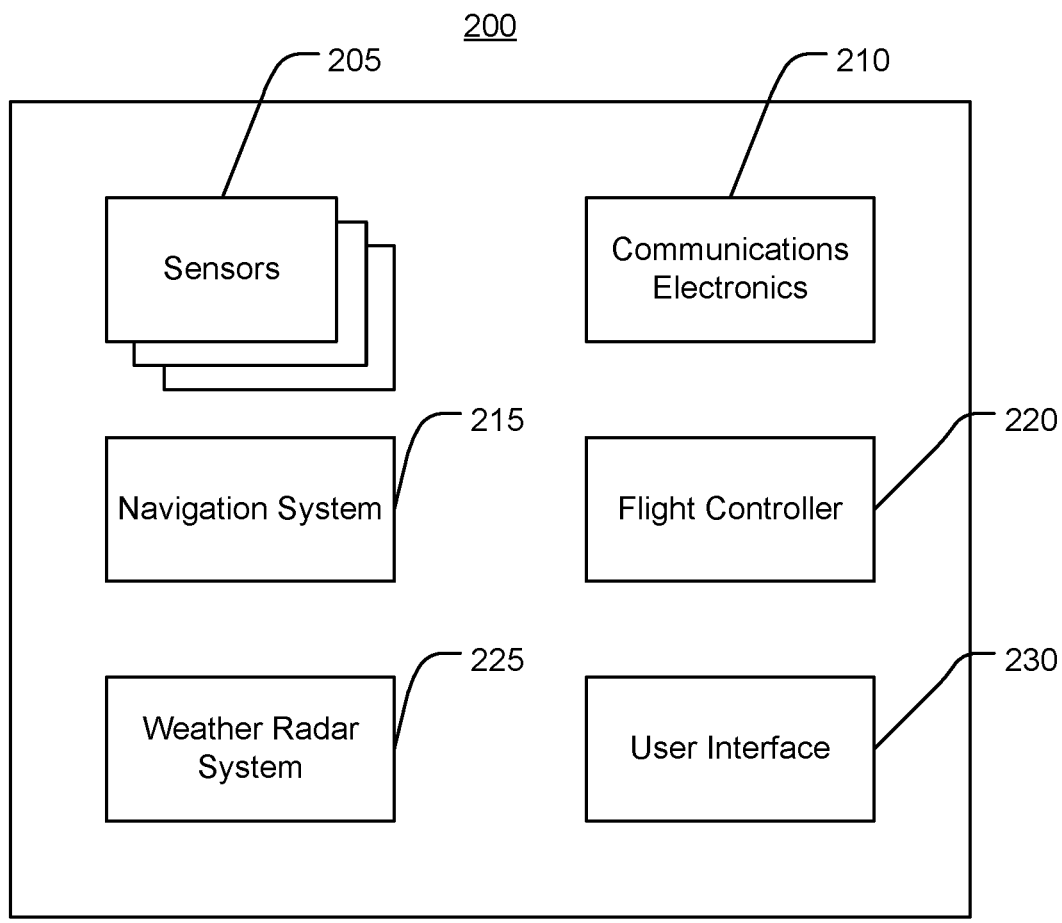
FIG. 2 is a block diagram of an exemplary embodiment of an avionics system according to the inventive concepts disclosed herein.

Referring now to FIG. 2, an avionics system 200 is shown according to an exemplary embodiment of the inventive concepts disclosed herein. The avionics system 200 includes one or more sensors 205, communications electronics 210, a navigation system 215, a flight controller 220, a weather radar system 225, and a user interface 230.

The one or more sensors 205 can be configured to detect position, speed, altitude, orientation, and other state parameters of the platform implementing the sensor(s) 205, as well as environmental parameters such as temperature, air pressure, and wind speed. The sensor(s) 205 may include at least one of an inertial measurement unit (which may include one or more gyroscopes and one or more accelerometers, such as three gyroscopes and three accelerometers), an air data sensor (e.g., sensor(s) configured to detect and output an indication of static pressure), or a magnetic compass.

The communications electronics 210 are configured to receive and transmit data. The communications electronics 210 can include receiver electronics and transmitter electronics. The communications electronics 210 can include a radio configured for radio frequency communication. The communications electronics 210 can include a datalink radio. The communications electronics 210 can enable the navigation system 215 to receive and transmit navigation information from/to remote platforms.

The navigation system 215 can generate navigation routes and can modify navigation routes in real time in response to avoidances, such as obstacles and changes in safety, including based on weather information. The navigation system 215 can incorporate features of the navigation system 300 described below with reference to FIG. 3.

The flight controller 220 is configured to generate control instructions for controlling movement of the platform, including but not limited to thrust and attitude instructions. The flight controller 220 can generate control instructions based on user input and/or information received from the navigation system 215. The flight controller 220 can include at least one of an autopilot or an autothrottle.

The weather radar system 225 can transmit radar signals, receive radar returns, and determine weather information based on the received radar returns.

The user interface 230 can display information generated by various components of the avionics system 200. The user interface 230 can incorporate features of the flight displays 20 and the UI elements described with reference to FIG. 1.

Figure 3:
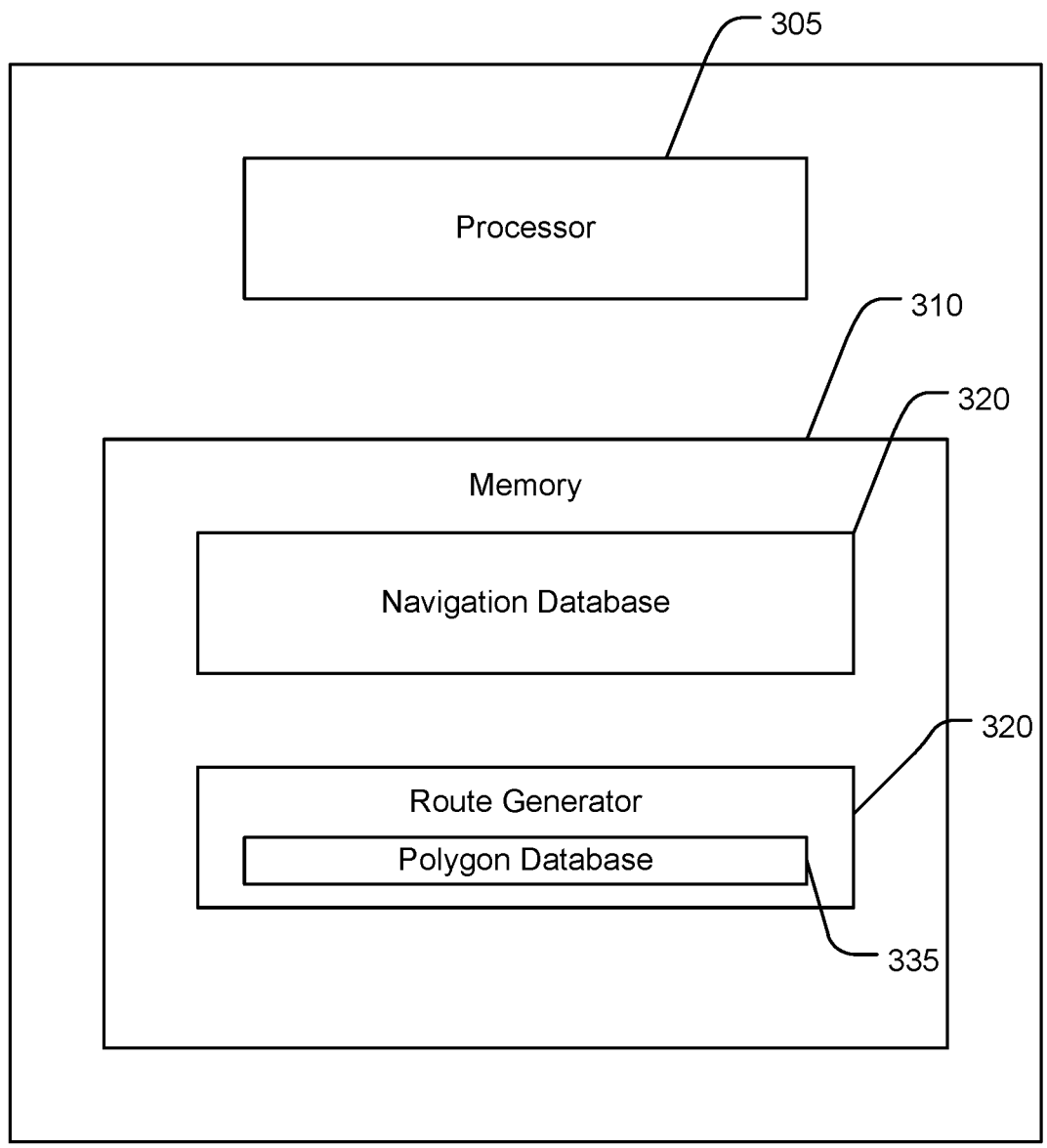
FIG. 3 is a block diagram of an exemplary embodiment of a navigation system including a route generator used to execute four-dimensional routing around concave moving polygon avoidances according to the inventive concepts disclosed herein.

Referring now to FIG. 3, a navigation system 300 is shown according to an exemplary embodiment of the inventive concepts disclosed herein. The navigation system 300 can incorporate features of and/or be implemented as the navigation system 215 described with reference to FIG. 2. The navigation system 300 includes a processor 305 and a memory 310. The processor 305 may be implemented as a specific purpose processor, an application specific integrated circuit (ASIC), one or more field programmable gate arrays (FPGAs), a group of processing components, or other suitable electronic processing components. The processor 305 may be a distributed computing system or a multi-core processor. The memory 310 is one or more devices (e.g., RAM, ROM, flash memory, hard disk storage) for storing data and computer code for completing and facilitating the various user or client processes, layers, and modules described in the present disclosure. The memory 310 may be or include volatile memory or non-volatile memory and may include database components, object code components, script components, or any other type of information structure for supporting the various activities and information structures of the inventive concepts disclosed herein. The memory 310 is communicably connected to the processor 305 and includes computer code or instruction modules for executing one or more processes described herein. The memory 310 can include various circuits, software engines, and/or modules that cause the processor to execute the systems and methods described herein. The memory may be distributed across disparate devices (e.g., a first device may include navigation database 320 (or components thereof) and a second device may include route generator 330).

The memory 310 includes a navigation database 320 and a route generator 330. The navigation database 320 maintains four-dimensional data corresponding to a plurality of cells into which the four-dimensional data is discretized (e.g., divided). Each cell can represent a three-dimensional space, from a start time to an end time. Each cell can represent a region of three-dimensional space. The cells can be non-overlapping, such that no cell extends within the border of another cell. The cells can be immediately adjacent, such that a border of a first cell at least partially coincides with (e.g., has the same spatial coordinates as) a border of a second cell. The plurality of cells may be represented as a grid. The cells can be configured such that each point in the three-dimensional space associated with the three-dimensional spatial data is associated with a single cell. For example, where the plurality of cells are configured as 1×1×1 cubic units, a rule can be applied such as "associate the point to the cell having the lesser dimension value in each dimension" to associate the point [1.0, 1.0, 0.0] to a cell extending between [0.0, 0.0, 0.0] and [1.0, 1.0, 1.0], rather than any other cell having a boundary at the point [1.0, 1.0, 0.0]. It will be appreciated that various other rules can be applied to enforce a requirement that each point be associated with a single cell.

The route generator 330 can process the four-dimensional data of the navigation database 320 and information regarding avoidances, including executing the functions described herein with further reference to FIGS. 4-9. The route generator 330 can receive the navigation database 320 (or components thereof) from a remote source, or can generate the navigation database 320 (or components thereof). For example, the route generator 330 can discretize four-dimensional data into the plurality of cells. The route generator 330 can discretize the four-dimensional data based on a cell size. The cell size may be adjusted based on factors such as navigational performance and solution quality (which can increase as cell size decreases) and desired computational efficiency (which can increase as cell size decreases).

The route generator 330 can receive an avoidance. The avoidance can represent weather, such as inclement weather (e.g., thunderstorms), other platforms, or any other moving entity or event which the platform should avoid. In some embodiments, the route generator 330 receives the avoidance from a weather radar system (e.g., weather radar system 225). In some embodiments, the route generator 330 receives the avoidance from an air traffic controller. The route generator 330 can associate the avoidance with the four-dimensional data. The route generator 330 can maintain information regarding avoidances in polygon database 335. The functions executed by route generator 330 can be performed on data structures representing avoidances and associated polygons maintained in polygon database 335.

Figure 4:
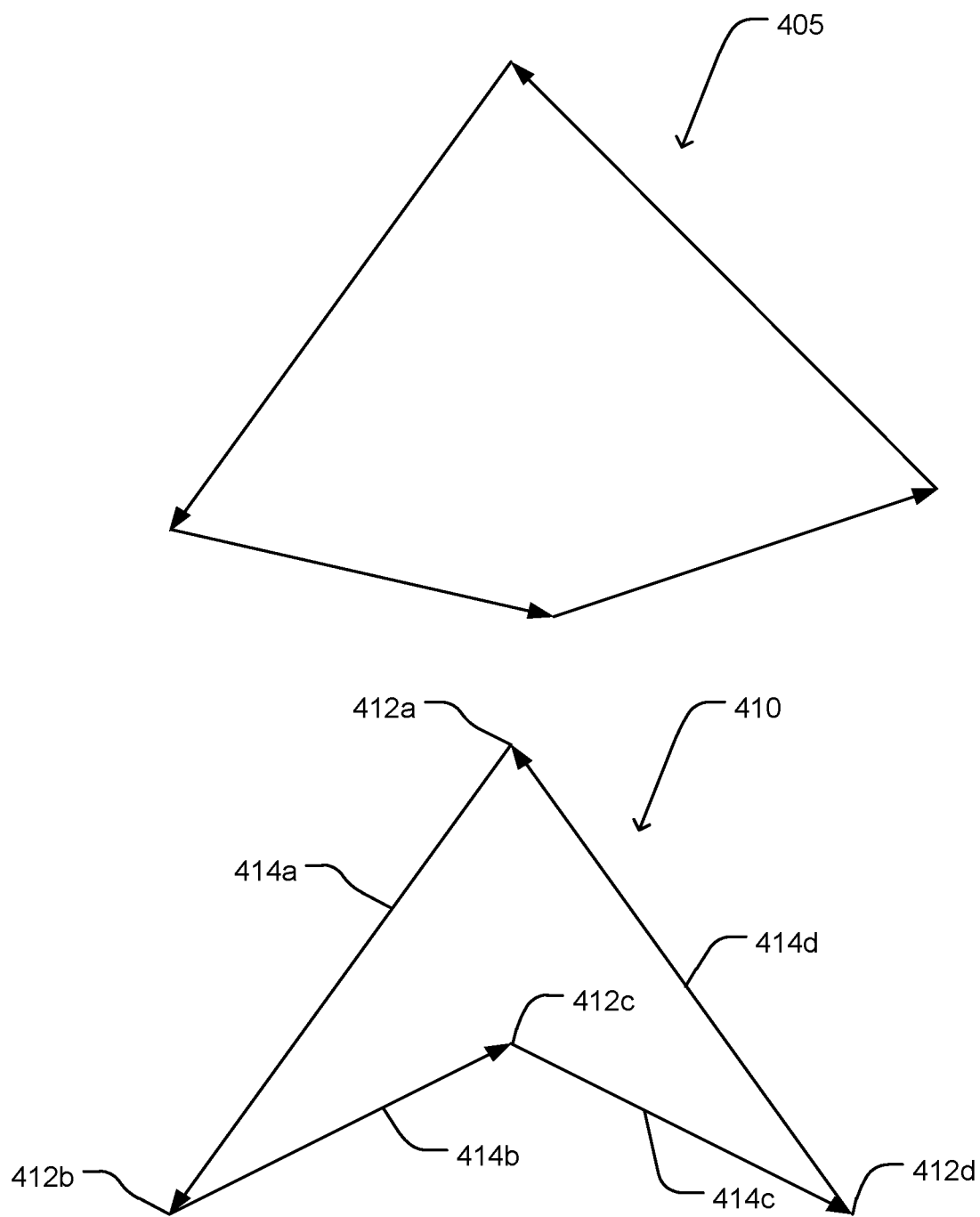
FIG. 4 is a schematic diagram of an exemplary embodiment of a convex polygon and a concave polygon according to the inventive concepts disclosed herein.

The route generator 330 can generate a polygon representing the avoidance. Referring further to FIG. 4, the route generator 330 can generate a convex polygon 405 or a concave polygon 410 to represent the avoidance, depending on geometric features of the avoidance (which the route generator 330 can extract from the information received when receiving the avoidance). The convex polygon 405 may be a polygon such that any line intersecting two edges of the polygon only intersects two edges of the polygon. The concave polygon 410 may be a polygon such that at least one line intersecting two edges of the polygon intersects at least three edges of the polygon. The polygons 405, 410 may be represented using various numbers of edges.

As shown in FIG. 4, the route generator 330 can generate the concave polygon 410 using a first vertex 412a, a second vertex 412b, a third vertex 412c, and a fourth vertex 412d, and a first edge 414a, a second edge 414b, a third edge 414c, and a fourth edge 414d. The route generator 330 can generate each edge to include a vector connecting respective vertices. For example, as shown in FIG. 4, the route generator 330 generates the polygon 410 using a first vector to represent the edge 414a in a first direction from the first vertex 412a to the second vertex 412b; a second vector to represent the edge 414b in a second direction from the second vertex 412b to the third vertex 412c; a third vector to represent the edge 414c in a third direction from the third vertex 412c to the fourth vertex 412d; and a fourth vector to represent the edge 414d in a fourth direction from the fourth vertex 412d to the first vertex 412a. The route generator 330 can generate the vectors in a head-to-tail manner such that each edge 414a, 414b, 414c, 414d starts where an adjacent edge ends. The route generator 330 can generate the directions of the vectors to be counter-clockwise (e.g., each end vertex of each edge, shown using the arrowhead in FIG. 4, is counter-clockwise with respect to the start vertex of the edge in view of a center of the concave polygon 410-vertex 412b is counter-clockwise with respect to vertex 412a; similarly, edge 414b is counter-clockwise with respect to vertex 414a) as shown in FIG. 4, or may generate the vectors to be clockwise.

The route generator 330 can assign positions to each vertex 412a, 412b, 412c, and 412d using a coordinate system of the four-dimensional data of the navigation database 320. For example, if the navigation database 320 uses a Cartesian coordinate system (x-, y-, and z-coordinates), the route generator 330 can assign an x-coordinate, y-coordinate, and z-coordinate to each vertex 412a, 412b, 412c, 412d. The route generator 330 can generate each vector of each edge 414a, 414b, 414c, 414d as a direction vector using the coordinate system of the four-dimensional data.

Figure 5:
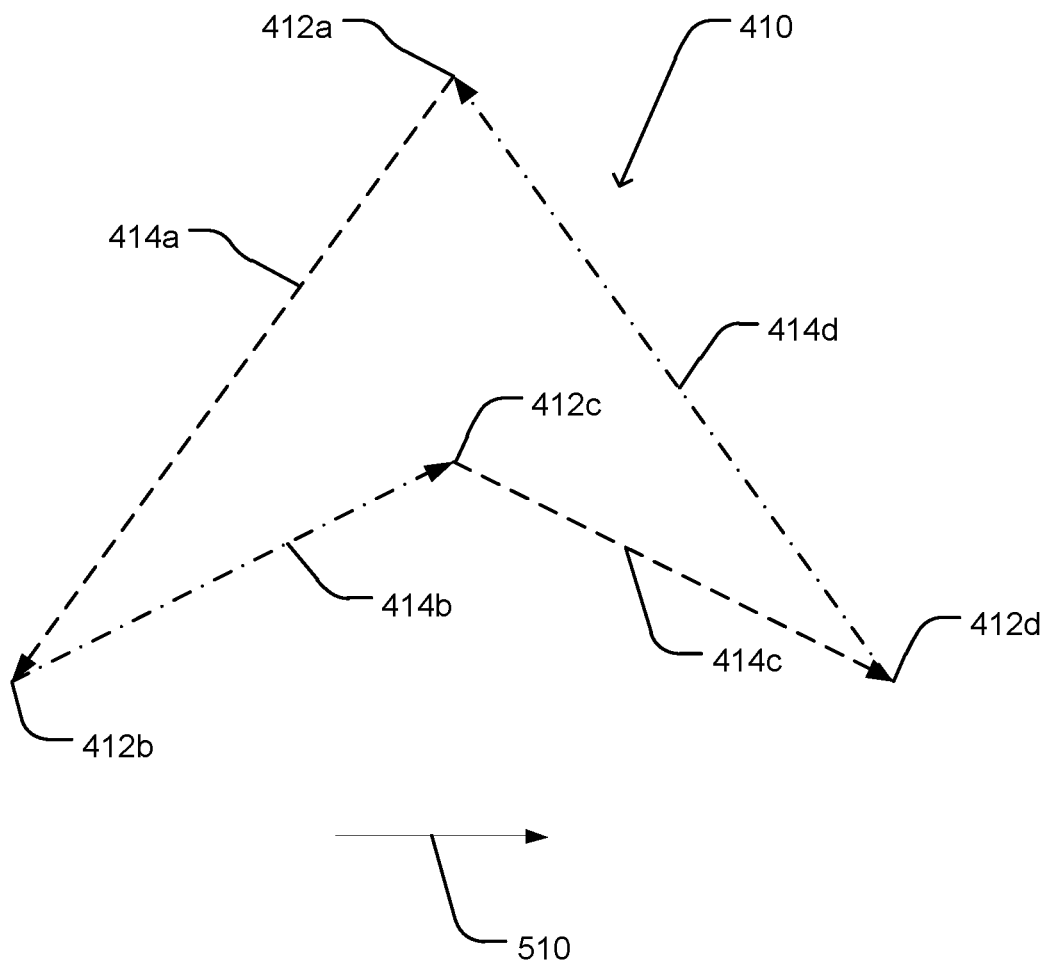
FIG. 5 is a schematic diagram of leading and trailing edges of the concave polygon of FIG. 4.

As shown in FIG. 5, the route generator 330 can identify a displacement vector 510 corresponding to movement of the avoidance represented by the concave polygon 410. In some embodiments, the route generator 330 receives the displacement vector when receiving the avoidance. For example, if the avoidance is a weather entity, the route generator 330 may receive a speed and direction associated with the weather entity (e.g., from weather radar system 225), and identify the displacement vector 510 based on the received speed and direction. In some embodiments, the route generator 330 calculates the displacement vector 510 based on information received regarding the avoidance, such as a plurality of positions of the avoidance as a function of time.

The route generator 330 can use the displacement vector 510 to categorize the edges 414a, 414b, 414c, 414d based on the directions of the edges 414a, 414b, 414c, 414d relative to the displacement vector 505. For example, the route generator 330 can identify at least one leading edge and at least one trailing edge of the edges 414a, 414b, 414c, and 414d. In some embodiments, each edge having a direction that crosses the displacement vector 510 in a first direction across the displacement vector 510 is a leading edge, and each edge having a direction that crosses the displacement vector 510 in a second direction opposite the first direction is a trailing edge. For illustrative purposes, FIG. 5 depicts the displacement vector 510 as moving horizontally, from left to right, given the counter-clockwise arrangement of the edges 414a, 414b, 414c, 414d. The route generator 330 can categorize the first edge 414a to be a trailing edge (depicted in FIG. 5 using a dashed line), as the start vertex of the edge 414a, first vertex 412a, would be above the displacement vector 510 while the end vertex of the edge 414a, second vertex 412b, would be below the displacement vector 510 (e.g., if the displacement vector 510 were arranged to cross the edge 414a). Similarly, the route generator 330 can categorize the third edge 414c to be a trailing edge (depicted in FIG. 5 using a dashed line), and categorize the edges 414b, 414d to be leading edges (depicted in FIG. 5 using dot-dashed lines) (the start vertex of the edge 414b, second vertex 412b, being below the end vertex of the edge 414b, third vertex 412c; the start vertex of the edge 414d, fourth vertex 412b, being below the end vertex of the edge 414d, first vertex 412a). The route generator 330 can categorize the edges in an opposite manner if the edges were arranged in a clockwise manner, such that the same edges would be determined to be leading or trailing edges.

In some embodiments, an edge may be parallel to the displacement vector 510. In such embodiments, the route generator 330 can determine whether the parallel edge is (i) located between two leading edges, (ii) located between two trailing edges, or (iii) located between a leading edge and a trailing edge; determine the parallel edge to be a leading edge if it is located between two leading edges; determine the parallel edge to be a trailing edge if it is located between two trailing edges; and delete or otherwise ignore the parallel edge if it is located between a leading edge and a trailing edge.

The route generator 330 can shift the concave polygon 410 through the four-dimensional space by shifting the concave polygon 410 using the displacement vector and the end time. As such, the resulting, shifted concave polygon can represent a time sweep of the avoidance as the avoidance moves over time from the start time to the end time. The route generator 330 can compare the time sweep to the plurality of cells of the navigation database 320 to determine which cells should be avoided for calculating a route.

Figure 6:
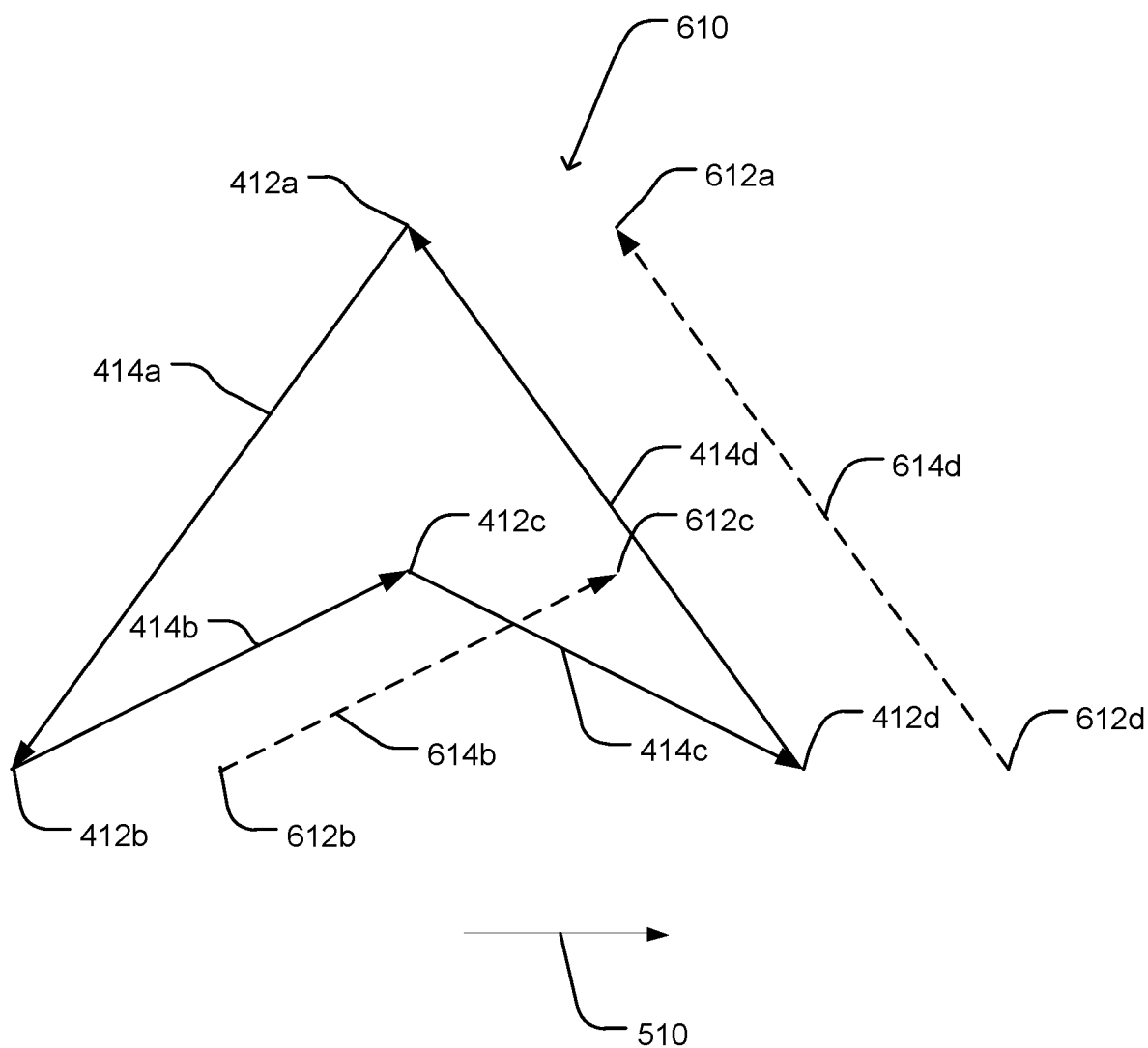
FIG. 6 is a schematic diagram of a shift of the concave polygon of FIG. 4.

In some embodiments, the route generator 330 shifts each leading edge using the displacement vector 510, while each trailing edge can be left at its original position, to generate a shifted concave polygon 610. For example, as shown in FIG. 6, the route generator 330 shifts the leading edges 414b, 414d using the displacement vector 510 to leading edges 614b, 614d (depicted using dashed lines), while the trailing edges 414a, 414c are not shifted. Leading edge 614b is from a shifted second vertex 612b to a shifted third vertex 612c. Leading edge 614d is from a shifted fourth vertex 612d to a shifted first vertex 612a. In some embodiments, the route generator 330 shifts the leading edges by adding the displacement vector 510 (which may be normalized to a unit vector and multiplied by a difference between the end time and start time) to the vertices of the leading edges.

As shown in FIG. 6, shifting the leading edges using the route generator 330 can result in gaps between vertices of the resulting concave polygon 610, particularly vertices of trailing edges that were not shifted and vertices of leading edges that were shifted. For example, unlike the original concave polygon 410, in which each edge is connected such that each vertex is a start vertex for a first edge and an end vertex for a second edge, in FIG. 6, there are gaps between second vertex 412b of trailing edge 414a and second vertex 612b of shifted leading edge 614b; between third vertex 412c of trailing edge 414c and third vertex 612c of shifted leading edge 614b; between fourth vertex 412d of trailing edge 414c and fourth vertex 612d of shifted leading edge 614d; and between first vertex 412a of trailing edge 414a and first vertex 612a of leading edge 614d.

Figure 7:
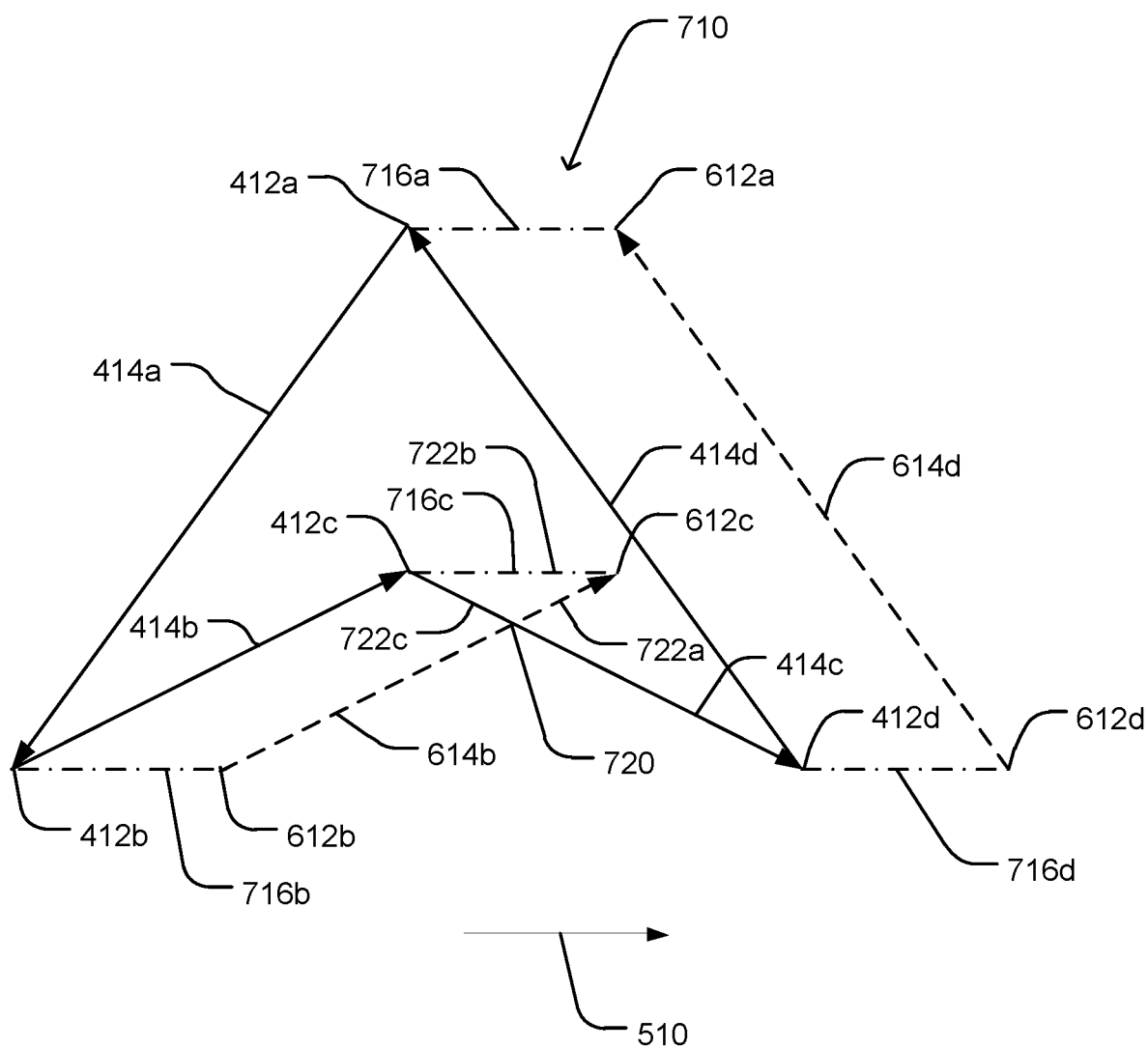
FIG. 7 is a schematic diagram of the concave polygon of FIG. 6 including added edges and internal edges.

As shown in FIG. 7, the route generator 330 can add added edges 716a, 716b, 716c, and 716d (depicted by dot-dashed lines) to the gaps resulting from the shifting of the leading edges based on identifying the gaps. The route generator 330 can identify each gap by iterating through each pair of unshifted and shifted vertices (e.g., first vertices 412a, 612a; second vertices 412b, 612b; third vertices 412c, 612c; fourth vertices 412d, 612d). The route generator 330 can thus add edge 716a to connect vertices 412a, 612a; add edge 716b to connect vertices 412b, 612b; add edge 716c to connect vertices 412c, 612c; and add edge 716d to connect vertices 412d, 612d; resulting in concave polygon 710.

As shown in FIG. 7, at least a portion of one or more edges of the concave polygon 710 is an internal edge located within an internal area of the concave polygon 710. Leaving internal edges in the representation of the concave polygon 710 may decrease the accuracy and speed of route calculation actions performed by the route generator 330. As such, the route generator 330 can remove internal edges from the concave polygon 710. The route generator 330 can identify each internal edge by determining whether the internal edge portion of the edge of the concave polygon 710 extends from an edge intersection into the internal area.

In some embodiments, the route generator 330 determines if an edge includes an internal edge by determining the edge to be a first edge that crosses a second edge at an edge intersection; determining the first edge to enter an internal area of the concave polygon 710 based on the first edge crossing the second edge and the edge direction of the first edge being the first direction (e.g., the first direction in which leading edges cross the displacement vector 510); and determining the first edge to exit the internal area based on the first edge crossing the second edge and the edge direction of the first edge being the second direction (e.g., the second direction opposite the first direction in which leading edges cross the displacement vector 510).

For example, as shown in FIG. 7, the route generator 330 can evaluate each edge to identify point 720 to be an edge intersection at which shifted leading edge 614b intersects trailing edge 414c. The route generator 330 can identify each edge intersection based on each edge at the edge intersection extending through the other edge. The route generator 330 can determine shifted leading edge 614b to enter the internal area of the concave polygon 710, as the trailing edge 414c crosses the shifted leading edge 614b from left to right. The route generator 330 can identify and remove internal edges 722a, 722b, and 722c using the edge intersection 720. For example, beginning with edge intersection 720, the route generate 330 can identify and remove internal edge 722a (e.g., by determining internal edge 722a to be the portion of shifted leading edge 614b on the internal, crossed-over side of shifted leading edge 614b); identify and remove internal edge 722b (being the edge that starts at vertex 612c at which shifted leading edge 614b ended), and identify and remove internal edge 722c (e.g., by determining internal edge 722c to be the edge that starts at vertex 412c where added edge 716c ended). The route generator 330 can terminate internal edge removal for each edge intersection upon returning to the edge intersection; for example, the route generator 330 can terminate internal edge removal for edge intersection 720 responsive to determining internal edge 722c to intersect the edge intersection 720.

Figure 8:
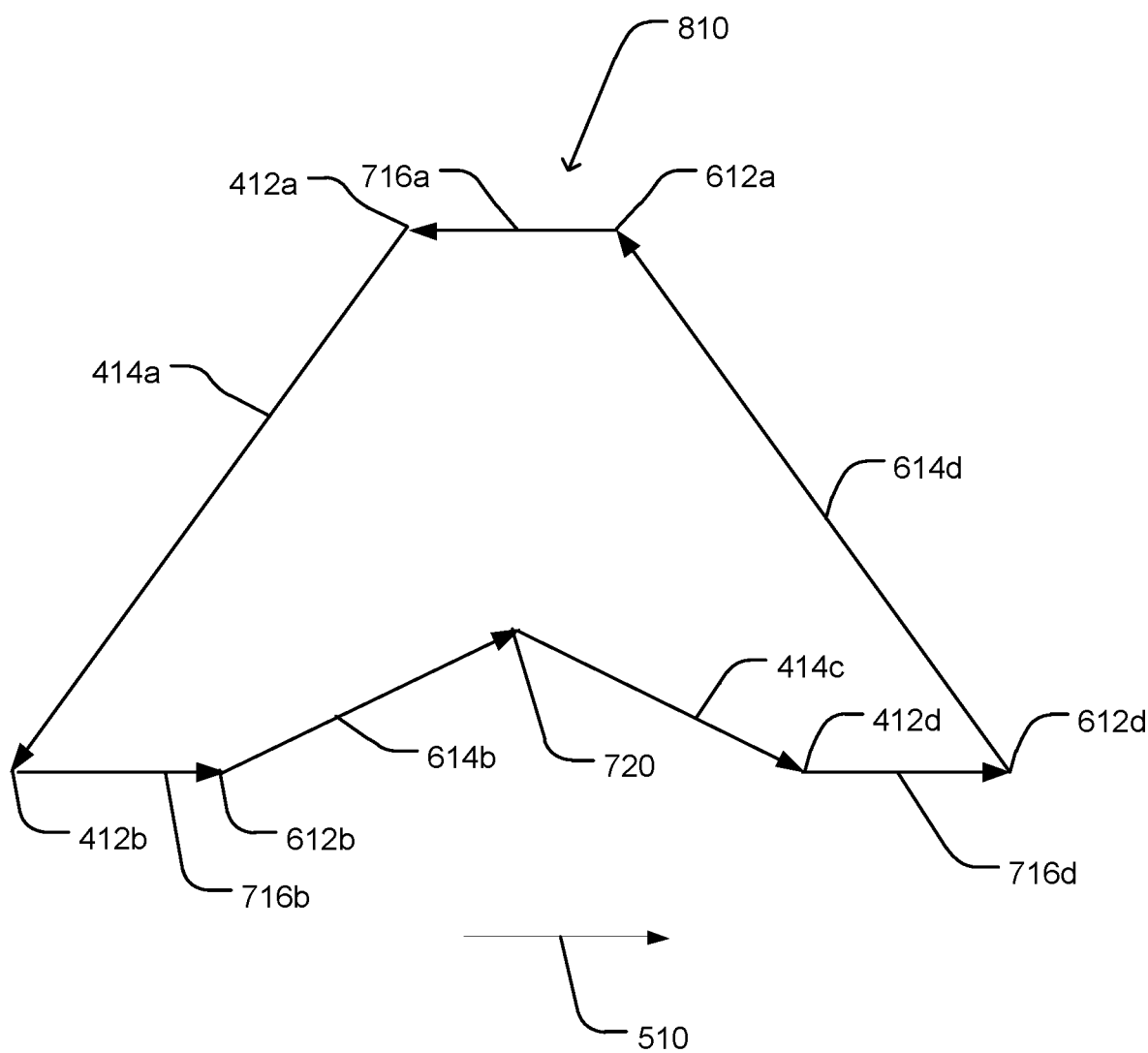
FIG. 8 is a schematic diagram of the concave polygon of FIG. 7 having internal edges removed.

In some embodiments, removing internal edges by the route generator 330 can include modifying an end vertex of the edge entering the internal area to be the edge intersection (e.g., with respect to FIG. 7, modifying the end vertex of the shifted leading edge 614b from third vertex 612c to edge intersection 720), modifying a start vertex of the edge exiting the internal area to be the edge intersection (e.g., with respect to FIG. 7, modifying the start vertex of the trailing edge 414c from third vertex 412c to edge intersection 720), and deleting any internal edges that no longer have both a start vertex and an end vertex (e.g., added edge 716c, representing internal edge 722b, can be deleted). In some embodiments, an entering intersection may not be in the same position as an exiting intersection, in which case the route generator 330 can add an edge to connect the entering intersection and exiting intersection. FIG. 8 depicts the concave polygon 810 generated by the route generator 330 to represent a time sweep of an avoidance, having added edges added and internal edges removed.

The route generator 330 can maintain a polygon database 335 to include the concave polygon 810. The route generator 330 can assign an avoidance identifier to each concave polygon 810 in the polygon database 335. The route generator 330 can execute a polygon triangulation algorithm to decompose the concave polygon 810 into a plurality of triangles, and maintains the concave polygon 810 as the plurality of triangles in the polygon database 335 (e.g., storing the triangles as objects with three references to vertices of the concave polygon 810).

The route generator 330 can identify one or more cells of the navigation database 320 in which the concave polygon 810 is located, including if the concave polygon 810 lies within the one or more cells and/or the concave polygon 810 intersects the one or more cells. For example, the route generator 330 can compare each concave polygon 810 to cells of the navigation database 320 to determine if the one or more cells are intersected by the concave polygon 810. In some embodiments, executing the polygon triangulation algorithm to decompose the concave polygon 810 into the plurality of triangles can enable the route generator 330 to identify one or more cells intersected by the concave polygon 810 responsive to determining at least one point of a cell to lie within a triangle of the concave polygon 810, which can increase computational speeds. In some embodiments, the route generator 330 can determine a cell to be intersected by the concave polygon 810 if at least one edge of the concave polygon 810 intersects the cell. In some embodiments, responsive to determining that no edge intersects the cell, the route generator 330 can determine whether a particular point (which may be randomly selected; which may be a center or corner) of the cell is located within the concave polygon 810; if the point is located within the concave polygon 810, than the cell can be identified to be a cell in which the concave polygon 810 is located. For example, if no edges of the concave polygon 810 intersect a particular cell, the cell may be understood to be entirely within the concave polygon 810 or entirely outside the concave polygon 810.

In some embodiments, the route generator 330 outputs a navigation alert based on the identified one or more cells. The route generator 330 can generate the navigation alert to identify each cell. The route generator 330 can generate the navigation alert to indicate information regarding the avoidance of the concave polygon 810. In some embodiments, the route generator 330 outputs the navigation alert to cause the user interface 230 (see FIG. 2) to present a representation of the navigation alert, such as a visual and/or audio representation. The route generator 330 can cause the user interface 230 to present a visual representation of the navigation alert and a flight plan. The route generator 330 can transmit the navigation alert to an air traffic controller to request a modified route from the air traffic controller.

In some embodiments, the route generator 330 calculates a modified route through the three-dimensional space based on the identified one or more cells. For example, the route generator 330 can modify an existing route by modifying a waypoint of a flight plan. The route generator 330 can calculate the modified route to avoid (e.g., not intersect) any of the identified one or more cells. In some embodiments, the route generator 330 causes an autopilot to modify operation based on the modified route. The route generator 330 can present the modified route using the user interface 230.

Figure 9:
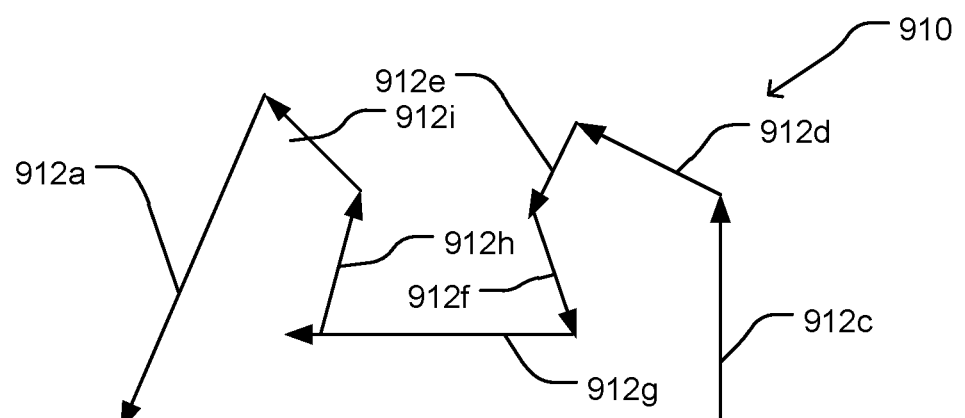
FIG. 9 is a schematic diagram of an exemplary embodiment of a concave polygon having a hole according to the inventive concepts disclosed herein.
Figure 9:
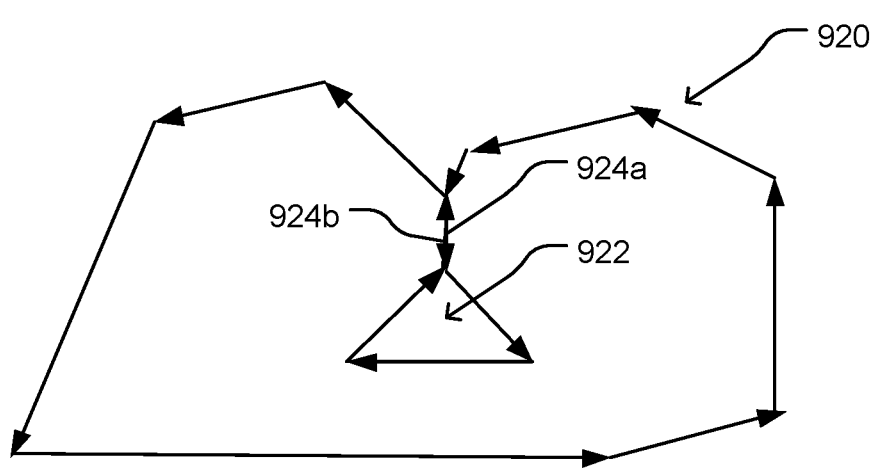

Referring now to FIG. 9, the route generator 330 can shift a concave polygon 910, using displacement vector 915. The concave polygon 910 includes trailing edges 912a, 912b, 912*e*, and 912*f*, and leading edges 912*c*, 912*d*, 912*g*, 912*h*, and 912*i*. The route generator 330 shifts the concave polygon 910 using displacement vector 915 to shifted concave polygon 920. As shown in FIG. 9, the shifted concave polygon 920 (having had added edges added and internal edges removed) a hole 922 which, while located within spatial bounds of at least some of the edges of shifted concave polygon 920, is located outside the shifted concave polygon 920. Holes, such as hole 922, created by the process of polygon shifting executed by route generator 330, may result from two coincident edges extending from the outside of the polygon to the hole (e.g., edge 924*a* leading from the outside to the hole 922, edge 924*b* leading from the hole 922 to the outside) in such a way that the polygon 920 wraps all the way around the hole 922 and touches itself, as such keeping the hole 922 on the outside of the polygon 920.

Figure 10:
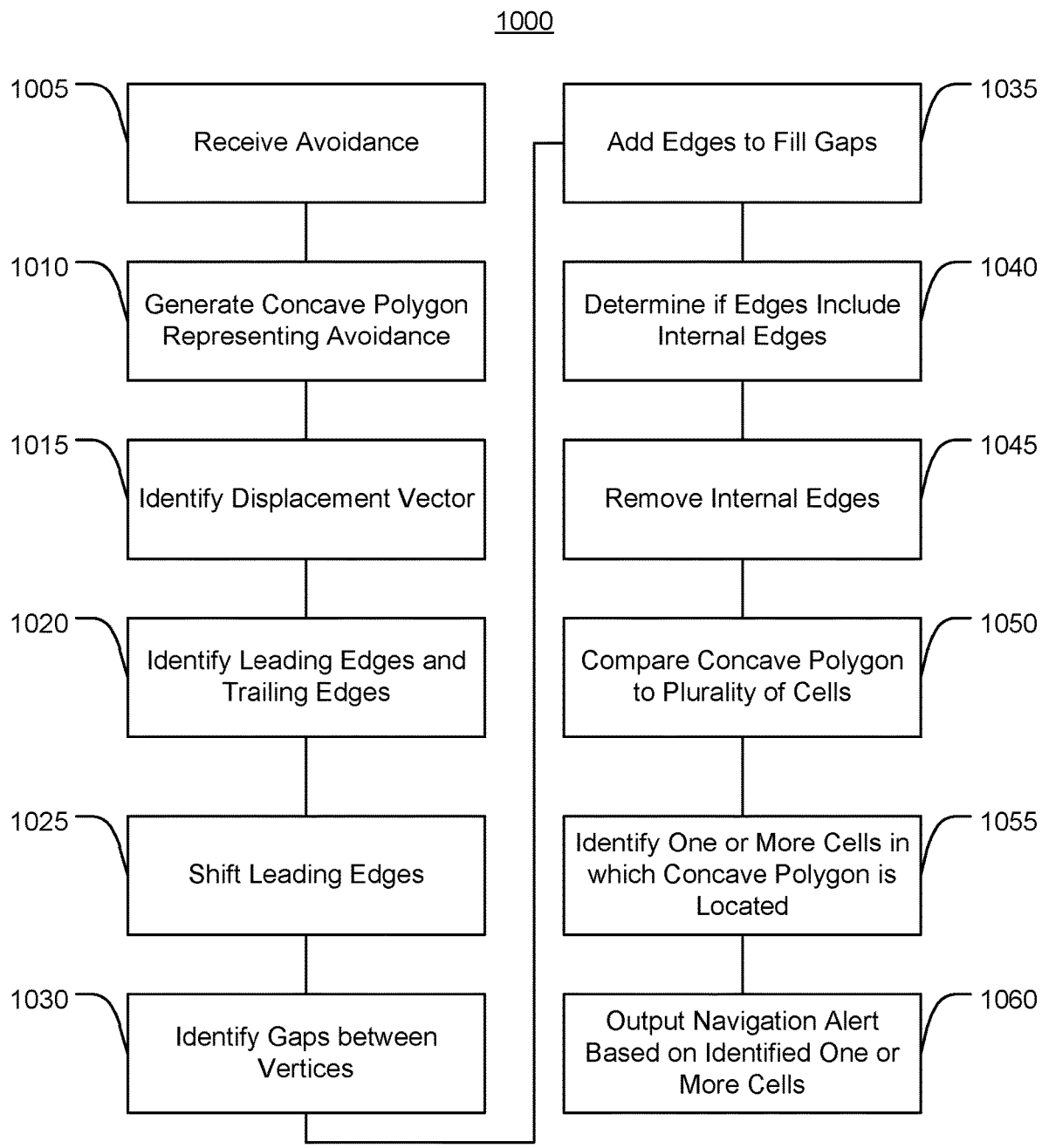
FIG. 10 is a flow diagram of an exemplary embodiment of a method for four-dimensional routing around moving concave polygon avoidances according to the inventive concepts disclosed herein.

Referring now to FIG. 10, a flow diagram of a method 1000 for four-dimensional routing around moving concave polygon avoidances is shown according to the inventive concepts disclosed herein. The method can be performed by the systems 200, 300 described herein.

A step (1005) may include receiving, by a route generator, an avoidance corresponding to four-dimensional data. The four-dimensional data can correspond to a plurality of cells into which the four-dimensional data is divided, each cell representing a three-dimensional space from a start time to an end time. Each cell may be assigned a north boundary, a south boundary, an east boundary, a west boundary, a bottom boundary, and a top boundary. The avoidance can represent weather, such as inclement weather (e.g., thunderstorms), other platforms, or any other moving entity or event which the platform should avoid. In some embodiments, the route generator receives the avoidance from a weather radar system (e.g., weather radar system 225). In some embodiments, the route generator receives the avoidance from an air traffic controller. The route generator can associate the avoidance with the four-dimensional data.

A step (1010) may include generating, by the route generator, a concave polygon representing the avoidance at the start time, the concave polygon including a plurality of edges. The concave polygon can be such that at least one line intersects the plurality of edges more than twice. The route generator can assign a vector to each edge from a first vertex of the edge (e.g., a start vertex) to a second vertex of the edge (e.g., an end vertex).

A step (1015) may include identifying, by the route generator, a displacement vector corresponding to movement of the avoidance. In some embodiments, the route generator receives the displacement vector when receiving the avoidance. For example, if the avoidance is a weather entity, the route generator may receive a speed and direction associated with the weather entity (e.g., from weather radar system 225), and identify the displacement vector based on the received speed and direction. In some embodiments, the route generator calculates the displacement vector based on information received regarding the avoidance, such as a plurality of positions of the avoidance as a function of time.

A step (1020) may include identifying, by the route generator based on the displacement vector, at least one leading edge and at least trailing edge of the concave polygon at the start time. For example, the route generator can identify the at least one leading edge to be each edge having an edge direction that crosses a direction of the displacement vector in a first direction across the displacement vector, and identify the at least one trailing edge to be each having edge an edge direction that crosses the direction of the displacement vector in a second direction opposite than the first direction.

A step (1025) may include shifting, by the route generator, each leading edge from the start time to the end time using the displacement vector. The route generator can shift the concave polygon through the four-dimensional space by shifting the concave polygon using the displacement vector and the end time.

A step (1030) may include identifying, by the route generator, each gap between vertices of the plurality of edges of the at least one trailing edge and the shifted at least one leading edge. The route generator can identify each gap by iterating through each pair of unshifted and shifted vertices to determine if there is a gap amongst the vertices of each pair.

A step (1035) may include adding, by the route generator, an added edge to the plurality of edges of the concave polygon to connect vertices across each identified gap.

A step (1040) may include determining, by the route generator, for each edge of the plurality of edges of the concave polygon, if the edge includes an internal edge. In some embodiments, the route generator identifies an internal edge by determining the edge to be a first edge that crosses a second edge at an edge intersection; determining the first edge to enter an internal area of the concave polygon based on the first edge crossing the second edge and the edge direction of the first edge being the first direction; and determining the first edge to exit the internal area based on the first edge crossing the second edge and the edge direction of the first edge being the second direction.

A step (1045) may include removing, by the route generator, each internal edge from the concave polygon. For example, the route generator can remove each internal edge by removing each internal edge extending from an edge intersection at which the first edge enters the internal area and an edge intersection at which the first edge exits the internal area. In some embodiments, the route generator executes a polygon triangulation algorithm to decompose the concave polygon into a plurality of triangles, and maintains the concave polygon as the plurality of triangles in a polygon database (e.g., storing the triangles as objects with three references to vertices of the concave polygon).

A step (1050) may include comparing, by the route generator, the concave polygon to the plurality of cells. A step (1055) may include identifying, by the route generator, one or more cells in which the concave polygon is located. The route generator can identify one or more cells of the navigation database in which the concave polygon is located, including if the concave polygon lies within the one or more cells and/or the concave intersects the one or more cells. For example, the route generator can compare each concave polygon to cells of the navigation database to determine if the one or more cells are intersected by the concave polygon. In some embodiments, executing the polygon triangulation algorithm to decompose the concave polygon into the plurality of triangles can enable the route generator to identify one or more cells intersected by the concave polygon responsive to determining at least one point of a cell to lie within a triangle of the concave polygon, which can increase computational speeds. In some embodiments, the route generator can determine a cell to be intersected by the concave polygon if at least one edge of the concave polygon intersects the cell. In some embodiments, responsive to determining that no edge intersects the cell, the route generator can determine whether a particular point (which may be randomly selected; which may be a center or corner) of the cell is located within the concave polygon; if the point is located within the concave polygon, than the cell can be identified to be a cell in which the concave polygon is located. For example, if no edges of the concave polygon intersect a particular cell, the cell may be understood to be entirely within the concave polygon or entirely outside the concave polygon.

A step (1060) may include outputting, by the route generator, a navigation alert based on the identified one or more cells. The route generator can generate the navigation alert to identify each cell. The route generator can generate the navigation alert to indicate information regarding the avoidance of the concave polygon. The route generator can transmit the navigation alert to an air traffic controller to request a modified route from the air traffic controller.

In some embodiments, the method 1000 includes using the identified one or more cells to modify a route through the three-dimensional space represented by the four-dimensional data to avoid the avoidance. In some embodiments, the method 1000 includes using a user interface to present at least one of a visual representation or an audio representation of the navigation alert, which may be presented with a flight plan.

As will be appreciated from the above, systems and methods for four-dimensional routing around moving concave polygon avoidances according to embodiments of the inventive concepts disclosed herein may improve operation of aircraft and other platforms by enabling a route generator to more accurately determine the space occupied by concave polygon avoidances, and generate modified routes and other information to avoid the concave polygon avoidances. The present solution can enable navigation systems to avoid concave polygon avoidances in real-time without requiring the computationally intensive and/or accuracy decreasing steps of converting concave polygons into convex polygons.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A navigation system, comprising:
    a navigation database maintaining four-dimensional data corresponding to a plurality of cells into which the four-dimensional data is divided, each cell representing a three-dimensional space from a start time to an end time;
    and
    a route generator configured to:
    receive an avoidance corresponding to the four-dimensional data;
    generate a concave polygon representing the avoidance at the start time, the concave polygon including a plurality of edges, by assigning a vector to each edge from a first vertex of the edge to a second vertex of the edge;
    identify a displacement vector corresponding to movement of the avoidance;
    identify, based on the displacement vector, at least one leading edge and at least one trailing edge of the concave polygon at the start time;
    shift each leading edge from the start time to the end time using the displacement vector;
    identify each gap between vertices of the plurality of edges of the at least one trailing edge and the shifted at least one leading edge;
    add an added edge to the plurality of edges of the concave polygon to connect vertices across each identified gap;
    determine, for each edge of the plurality of edges of the concave polygon, if the edge includes an internal edge;
    remove each internal edge from the concave polygon;
    compare the concave polygon to the plurality of cells;
    identify one or more cells in which the concave polygon is located;
    and
    output a navigation alert based on the identified one or more cells.

2. The navigation system of claim 1, wherein the route generator uses the identified one or more cells to modify a route through the three-dimensional space represented by the four-dimensional data to avoid the avoidance.

3. The navigation system of claim 1, wherein the route generator uses the avoidance to assign a first vertex position to a first vertex of each edge and a second vertex position to a second vertex of each edge, the first vertex position and second vertex position assigned using a coordinate system of the four-dimensional data.

4. The navigation system of claim 1, wherein each first vertex of a first edge of the plurality of edges is a second vertex of a second edge of the plurality of edges.

5. The navigation system of claim 1, wherein the route generator identifies the at least one leading edge to be each edge having an edge direction that crosses a direction of the displacement vector in a first direction across the displacement vector, and identifies the at least one trailing edge to be each edge having an edge direction that crosses the direction of the displacement vector in a second direction opposite than the first direction.

6. The navigation system of claim 5, wherein the route generator:
    determines if the edge includes an internal edge by:
    determining the edge to be a first edge that crosses a second edge at an edge intersection;
    determining the first edge to enter an internal area of the concave polygon based on the first edge crossing the second edge and the edge direction of the first edge being the first direction;
    determining the first edge to exit the internal area based on the first edge crossing the second edge and the edge direction of the first edge being the second direction;
    and
    removes each internal edge by removing each internal edge extending from an edge intersection at which the first edge enters the internal area and an edge intersection at which the first edge exits the internal area.

7. The navigation system of claim 1, wherein the route generator identifies the one or more cells intersected by the concave polygon based on at least one edge of the plurality of edges of the concave polygon intersecting a corresponding edge of the cell.

8. The navigation system of claim 1, wherein the navigation database assigns to each cell a north boundary, a south boundary, an east boundary, a west boundary, a bottom boundary, and a top boundary.

9. The navigation system of claim 1, further comprising a display device configured to receive the navigation alert, present an indication of the navigation alert, and present a flight plan.

10. The navigation system of claim 1, wherein at least one line intersects the plurality of edges of the concave polygon more than twice.

11. A navigation route generator, comprising:
one or more processors;
and
a non-transient computer-readable medium storing processor- executable instructions which, when executed by the one or more processors, cause the one or more processors to:
maintain, in a navigation database, four-dimensional data corresponding to a plurality of cells into which the four-dimensional data is divided, each cell representing a three-dimensional space from a start time to an end time;
receive an avoidance corresponding to four-dimensional data;
generate a concave polygon representing the avoidance at the start time, the concave polygon including a plurality of edges, by assigning a vector to each edge from a first vertex of the edge to a second vertex of the edge;
identify a displacement vector corresponding to movement of the avoidance;
identify, based on the displacement vector, at least one leading edge and at least one trailing edge of the concave polygon at the start time;
shift each leading edge from the start time to the end time using the displacement vector;
identify each gap between vertices of the plurality of edges of the at least one trailing edge and the shifted at least one leading edge;
add an added edge to the plurality of edges of the concave polygon to connect vertices across each identified gap;
determine, for each edge of the plurality of edges of the concave polygon, if the edge includes an internal edge;
remove each internal edge from the concave polygon; compare the concave polygon to the plurality of cells;
identify one or more cells in which the concave polygon is located;
and output a navigation alert based on the identified one or more cells.

12. The navigation route generator of claim 11, comprising instructions that cause the one or more processors to:
use the identified one or more cells to modify a route through the three-dimensional space represented by the four-dimensional data to avoid the avoidance.

13. The navigation route generator of claim 11, comprising instructions that cause the one or more processors to:
use the avoidance to assign a first vertex position to a first vertex of each edge and a second vertex position to a second vertex of each edge, the first vertex position and second vertex position assigned using a coordinate system of the four-dimensional data.

14. The navigation route generator of claim 11, comprising instructions that cause the one or more processors to:
identify the at least one leading edge to be each edge having an edge direction that crosses a direction of the displacement vector in a first direction across the displacement vector, and identifies the at least one trailing edge to be each edge having an edge direction that crosses the direction of the displacement vector in a second direction opposite than the first direction.

15. A method, comprising:
maintaining, by a navigation database, four-dimensional data corresponding to a plurality of cells into which the four-dimensional data is divided, each cell representing a three-dimensional space from a start time to an end time;
receiving, by a route generator, an avoidance corresponding to the four-dimensional data;
generating, by the route generator, a concave polygon representing the avoidance at the start time, the concave polygon including a plurality of edges;
identifying, by the route generator, a displacement vector corresponding to movement of the avoidance;
identifying, by the route generator based on the displacement vector, at least one leading edge at the start time, the at least one leading edge having a first edge direction that crosses a direction of the displacement vector in a first direction across the displacement vector, the at least one trailing edge having a second edge direction that crosses the direction of the displacement vector in a second direction opposite the first direction;
shifting, by the route generator, each leading edge from the start time to the end time using the displacement vector;
identifying, by the route generator, each gap between vertices of the plurality of edges of the at least one trailing edge and the shifted at least one leading edge;
adding, by the route generator, an added edge to the plurality of edges of the concave polygon to connect vertices across each identified gap;
determining, by the route generator, for each edge of the plurality of edges of the concave polygon, if the edge includes an internal edge;
removing, by the route generator, each internal edge from the concave polygon; comparing, by the route generator, the concave polygon to the plurality of cells; identifying, by the route generator, one or more cells in which the concave polygon is located;
and
outputting, by the route generator, a navigation alert based on the identified one or more cells.

16. The method of claim 15, comprising:
using, by the route generator, the identified one or more cells to modify a route through the three-dimensional space represented by the four-dimensional data to avoid the avoidance.

17. The method of claim 15, comprising:
presenting, by a display device, an indication of the navigation alert and a flight plan.

18. The navigation system of claim 1, wherein each leading edge is assigned one of a clockwise vector or a counterclockwise vector.

* * * * *